United States Patent
Onodera

(10) Patent No.: US 9,436,795 B2
(45) Date of Patent: Sep. 6, 2016

(54) LAYOUT VERIFICATION METHOD AND VERIFICATION APPARATUS

(71) Applicant: Socionext Inc., Yokohama-shi, Kanagawa (JP)

(72) Inventor: Mitsuru Onodera, Akiruno (JP)

(73) Assignee: SOCIONEXT INC., Yokohama (JP)

( * ) Notice: Subject to any disclaimer, the term of this patent is extended or adjusted under 35 U.S.C. 154(b) by 0 days.

(21) Appl. No.: 14/619,494

(22) Filed: Feb. 11, 2015

(65) Prior Publication Data

US 2015/0254392 A1 Sep. 10, 2015

(30) Foreign Application Priority Data

Mar. 4, 2014 (JP) ................. 2014-041579

(51) Int. Cl.
G06F 17/50 (2006.01)
(52) U.S. Cl.
CPC ....... G06F 17/5081 (2013.01); G06F 17/5031 (2013.01)
(58) Field of Classification Search
CPC ................. G06F 17/5081; G06F 17/5031
USPC ................. 716/111, 113, 114, 134
See application file for complete search history.

(56) References Cited

U.S. PATENT DOCUMENTS

| | | | | | |
|---|---|---|---|---|---|
| 5,983,008 | A * | 11/1999 | Kumashiro | ......... | G06F 17/5022 257/E27.108 |
| 7,155,689 | B2 * | 12/2006 | Pierrat | ................ | G06F 17/5036 716/52 |
| 7,171,641 | B2 * | 1/2007 | Kurose | ............... | G06F 17/5022 716/113 |
| 7,299,438 | B2 * | 11/2007 | Hosono | ................ | G01R 29/023 703/19 |
| 7,320,115 | B2 * | 1/2008 | Kuo | ..................... | G06F 17/5081 324/501 |
| 7,975,249 | B2 * | 7/2011 | Akutsu | ............... | G06F 17/5031 703/16 |
| 8,103,991 | B2 * | 1/2012 | Murakami | .......... | G06F 17/5081 716/100 |
| 8,166,432 | B2 * | 4/2012 | Kosugi | ............... | G06F 17/5031 703/14 |
| 8,504,347 | B2 * | 8/2013 | Kosugi | ............... | G06F 17/5031 703/16 |
| 2006/0129964 | A1 * | 6/2006 | Shibasaki | ............ | G06F 17/505 716/113 |
| 2008/0104563 | A1 * | 5/2008 | Kosugi | ............... | G06F 17/5036 716/114 |
| 2009/0276746 | A1 | 11/2009 | Nagai | | |

FOREIGN PATENT DOCUMENTS

| | | |
|---|---|---|
| JP | 11-008308 | 1/1999 |
| JP | 2002-279013 | 9/2002 |
| JP | 2009-271607 | 11/2009 |

* cited by examiner

Primary Examiner — Sun Lin
(74) Attorney, Agent, or Firm — Staas & Halsey LLP

(57) ABSTRACT

A method of verifying a layout of a semiconductor integrated circuit is disclosed. The method includes executing a timing analysis of the semiconductor integrated circuit based on first layout information acquired after execution of a layout process of the semiconductor integrated circuit, executing layout correction with respect to the first layout information, comparing the first layout information acquired before the execution of the layout correction and second layout information acquired after the execution of the layout correction to acquire information indicating an RC difference in wires of the semiconductor integrated circuit before and after the execution of the layout correction, and adding, by a computer, an effect due to an increase in delay in the wires resulting from the RC difference to timing information obtained by the timing analysis.

13 Claims, 18 Drawing Sheets

FIG.12
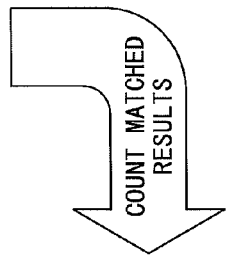
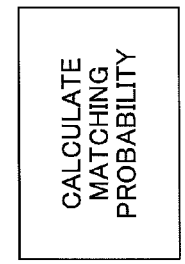

FIG.14

```
module data_path (
    DATA,
    CLOCK,
    OUT_DATA
);

input    DATA       ;
input    CLOCK      ;
output   OUT_DATA   ;

wire     CK_NET1    ;
wire     DATA_NET1  ;
wire     Comb_NET   ;
wire     DATA_NET2  ;
wire     CK_NET2    ;

CK_BUF   CK1    (  .I(CLOCK),    .O(CK_NET1)                         );
DFF      DFF1   (  .D(DATA),     .CK(CK_NET1),   .Q(DATA_NET1)       );
Comb     Comb   (  .O(Comb_NET)                                      );
AND      AND
(  .A(DATA_NET1),   .B(Comb_NET),    .Y(DATA_NET2)    );
CK_BUF   CK2
(  .I(CK_NET1),     .O(CK_NET2)                       );
DFF      DFF2
(  .D(DATA_NET2),   .CK(CK_NET2),    .Q(OUT_DATA)     );

endmodule
```

FIG.15

```
*SPEF "IEEE 1481-1999"
*DESIGN "data_path"
*DATE "Date"
*VENDOR "Vendor Name"
*PROGRAM "Program Name"
*VERSION "Version"
*DIVIDER .
*DELIMITER :
*BUS_DELIMITER []
*T_UNIT 1.00000 NS
*C_UNIT 1.00000 FF
*R_UNIT 1.00000 OHM
*L_UNIT 1.00000 HENRY

*D_NET DATA_NET1 10.10

*CONN
*I AND:A      I *S 0 0 *L 0
*I DFF1:Q     O *S 0 0 *L 0

*CAP

1 DATA_NET1:1    2.2
2 DATA_NET1:2    2.2
3 DATA_NET1:3    2.2
4 DATA_NET1:4    2.2
5 DATA_NET1:5    2.2

*RES
1 DFF1:Q         DATA_NET1:1   20
1 DATA_NET1:1    DATA_NET1:2   20
1 DATA_NET1:2    DATA_NET1:3   20
1 DATA_NET1:3    DATA_NET1:4   20
1 DATA_NET1:4    DATA_NET1:5   20
1 DATA_NET1:5    AND:A         20

*END
```

FIG.16

| Point | Incr | Path |
|---|---|---|
| clock CLOCK (rise edge) | 0.000 | 0.000 |
| clock network delay (propagated) | 0.000 | 0.000 |
| DFF1/Q (DFF) | 0.050 | 0.050 |
| AND/A (AND) | 0.010 | 0.060 |
| AND/Y (AND) | 0.050 | 0.110 |
| DFF2/D (DFF) | 0.010 | 0.120 |
| data arrival time | | 0.120 |
| | | |
| clock CLOCK (rise edge) | 2.000 | 2.000 |
| clock source latency | 0.000 | 2.000 |
| CK1/A (CK_BUF) | 0.010 | 2.010 |
| CK1/O (CK_BUF) | 0.010 | 2.020 |
| CK2/A (CK_BUF) | 0.010 | 2.030 |
| CK2/O (CK_BUF) | 0.010 | 2.040 |
| DFF2/CK (DFF) | 0.010 | 2.050 |
| clock reconvergence pessimism | 0.000 | 2.050 |
| clock uncertainty | -0.400 | 1.650 |
| library setup time | -0.020 | 1.630 |
| data required time | | 1.630 |
| | | |
| data required time | | 1.650 |
| data arrival time | | -0.170 |

BEFORE DFM

AFTER DFM

LAYOUT VERIFICATION METHOD AND VERIFICATION APPARATUS

CROSS-REFERENCE TO RELATED APPLICATION

This patent application is based upon, and claims the benefit of priority of Japanese Patent Application No. 2014-041579 filed on Mar. 4, 2014, the entire contents of which are incorporated herein by reference.

FIELD

The disclosures discussed herein relate to a design technology for a semiconductor integrated circuit.

BACKGROUND

In designing a semiconductor integrated circuit (hereinafter called a "large-scale integrated circuit (LSI)"), resistance and capacitance (RC) extraction within the circuit is conducted based on layout information of a designed circuit, and the layout information of the circuit is corrected in a case where it is determined that timing constraint is not satisfied by the RC extracted result. The RC extraction is conducted using the corrected layout information after the correction of the layout information of the circuit.

To efficiently calculate a delay time associated with the layout correction, there is proposed a technology to partially calculate the delay time by acquiring wiring information affected by the layout correction, and extracting RC connection information merely associated with this acquired wiring information affected by the layout correction.

RELATED ART DOCUMENTS

Patent Documents

Patent Document 1: Japanese Laid-open Patent Publication No. 2002-279013
Patent Document 2: Japanese Laid-open Patent Publication No. 11-008308
Patent Document 3: Japanese Laid-open Patent Publication No. 2009-271607

SUMMARY

According to an aspect of the embodiments, there is provided a method of verifying a layout of a semiconductor integrated circuit. The method includes executing a timing analysis of the semiconductor integrated circuit based on first layout information acquired after execution of a layout process; executing layout correction with respect to the first layout information; comparing the first layout information acquired before the execution of the layout correction and second layout information acquired after the execution of the layout correction to acquire information indicating an RC difference in wires; and adding, by a computer, an effect due to an increase in delay in the wires resulting from the RC difference to timing information obtained by the timing analysis.

It is to be understood that both the foregoing general description and the following detailed description are exemplary and explanatory and are not restrictive of the invention.

Additional objects and advantages of the embodiments will be set forth in part in the description which follows, and in part will be obvious from the description, or may be learned by practice of the invention.

BRIEF DESCRIPTION OF THE DRAWINGS

FIG. 12 is a diagram illustrating an exemplified process of step S65 in FIG. 7;
FIG. 14 is a diagram illustrating an example of a Verilog netlist;
FIG. 15 is a diagram illustrating an example of an RC netlist;
FIG. 16 is a diagram illustrating a partial example of a characteristics change report.

DESCRIPTION OF EMBODIMENTS

In designing an LSI, a timing analysis such as physical verification (PV), an operation check, and a timing violation check (a simulation/static timing analysis (simulation/STA)) may be conducted using layout information for placing and routing (P and R) cells forming the LSI. The layout information is then automatically corrected by automatically correcting a design for manufacturing (DFM) (hereinafter called "DFM automatic correction" or "DFM auto-correction"), and the PV is subsequently conducted again. A fabrication process of the LSI is conducted thereafter.

In the above-described LSI design process, an effect on timing characteristics caused by the DFM auto-correction may be very small, and hence, the timing characteristics acquired after the DFM auto-correction are not verified in general. However, in a recent advanced microfabrication process of wiring, there may be concern about the timing characteristics after the automatic correction that may adversely affect yield of the LSI Accordingly, there is proposed a technique to verify the timing characteristics after the DFM auto-correction. When the simulation/STA accompanying the engineer's work is conducted, a design period determined by the engineer may be elongated, which may result in significantly increasing overhead in a design turn-around time (design TAT).

In one aspect of embodiments, a characteristics change caused by the layout change may effectively be verified.

Further, the above-described technique may be implemented by a verification apparatus or a computer that causes a processor to execute a verification program stored in a non-transitory computer-readable medium.

In the following, a description is given of embodiments with reference to accompanying drawings. Initially, a consideration is given of a characteristics verification process to verify a characteristics change caused by the DFM auto-correction after placing and routing cells in designing a large-scale integrated circuit (LSI) by conducting the timing analysis such as an operation check and a timing violation check (a simulation/static timing analysis (simulation/STA)).

Figure 1:
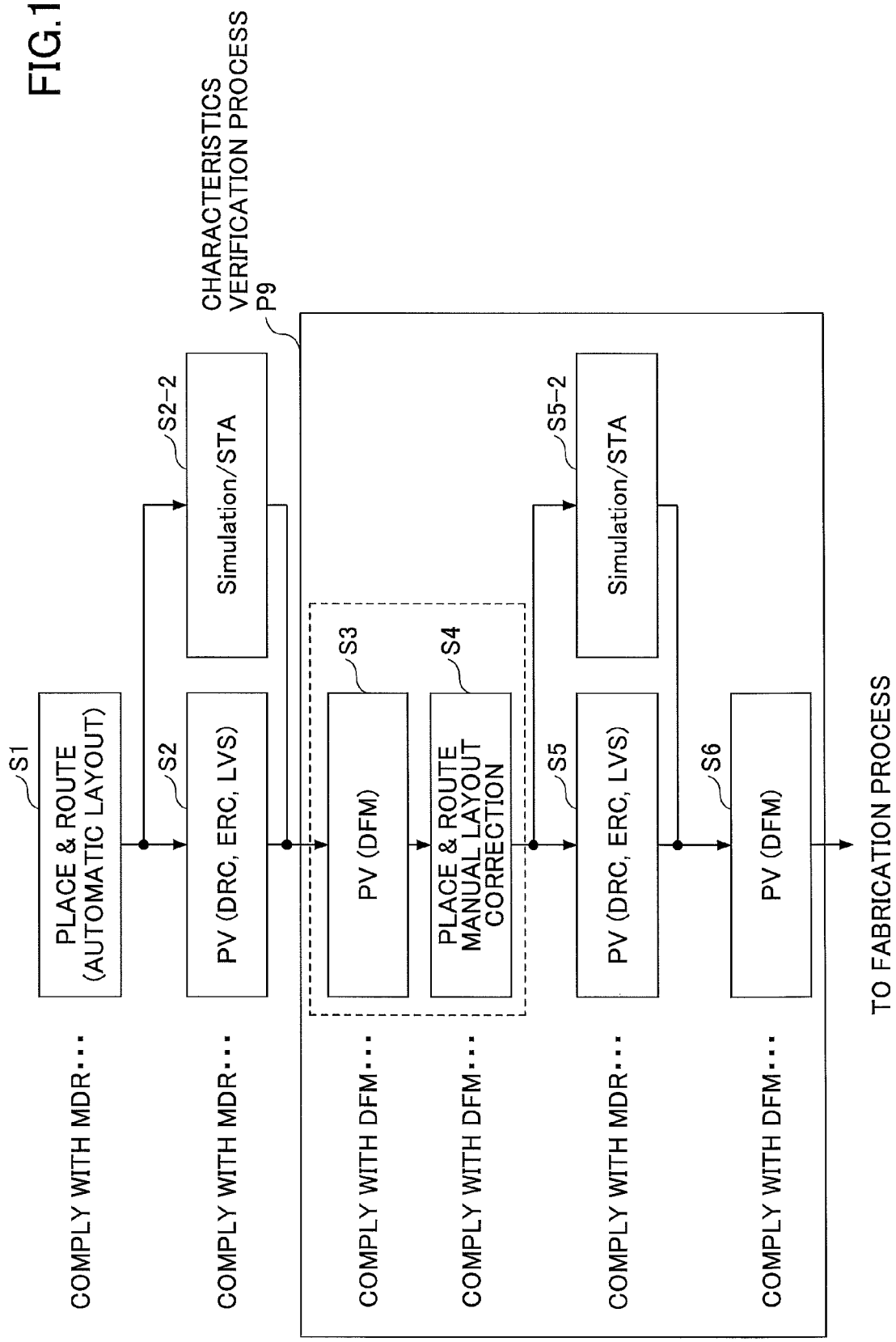
FIG. 1 is a flowchart illustrating an example of a characteristics verification process.

FIG. 1 is a flowchart illustrating an example of a characteristics verification process. In FIG. 1, a layout is automatically generated by placing and routing (P and R) cells based on data associated with an LSI such as a netlist indicating a connection relationship between the cells (step S1).

Physical verification (PV) such as a design rule check (DRC), an electric rule check (ERC), and layout versus schematic (LVS) verification between elements is conducted with respect to the layout after the cells are placed and routed (P and R) (step S2). Further, the timing analysis such as an operation check and a timing violation check (a simulation/static timing analysis (simulation/STA)) is conducted by an engineer (step S2-2).

After the layout verification, a characteristics verification process P9 including steps S3 to S6 is executed. In the characteristics verification process P9, the verification considering the variability in the fabrication of LSI is conducted in steps S3 and S4. In step S3, physical verification (PV) is conducted based on the DFM. In step S4, the layout is corrected by the engineer changing the placing and routing (P and R) of the cells.

Then, the PV including the design rule check (DRC), the electric rule check (ERC), and the layout versus schematic (LVS) between elements is conducted, similar to step S2 (step S5). Further, the timing analysis such as the operation check and the timing violation check (the simulation/static timing analysis (simulation/STA)) is conducted by the engineer, similar to step S2-2. After the design verification with respect to the LSI design is conducted, the verification considering the variability in the fabrication of LSI is conducted (step S6).

After the above-described verification, an LSI is fabricated based on the design in the fabrication process. Note that in the above description, steps S1, S2, S2-2, S5, and S5-2 are conducted in compliance with the mask design rule (MDR). Further, steps S3, S4, and S6 are conducted in compliance with the design for manufacturing (DFM).

In the exemplified characteristics verification process P9, the verification (steps S2-2 and S5-2) and the correction (step S3) involve the engineer's work, which may impose burdens on the engineer. Hence, steps S3 and S4 associated with the DFM may be automated. However, a characteristics verification after DFM auto-correction may require several months for simulation and the engineer's work. In the exemplified characteristics verification process P9, it may be difficult to improve the design TAT while maintaining the timing characteristic.

As described below, the LSI design of the present embodiment may provide a technique to improve yield without having to reconduct the timing analysis such as the operation check and the timing violation check (the simulation/static timing analysis (simulation/STA)) after DFM auto-correction.

The present embodiment may improve the yield without reconducting the timing analysis such as the operation check and the timing violation check (the simulation/static timing analysis (simulation/STA)) after DFM auto-correction by conducting a DFM determination process that determines presence or absence of a characteristics change caused by the DFM auto-correction. The present embodiment may further improve the design TAT by excluding the verification conducted by the engineer.

Figure 2:
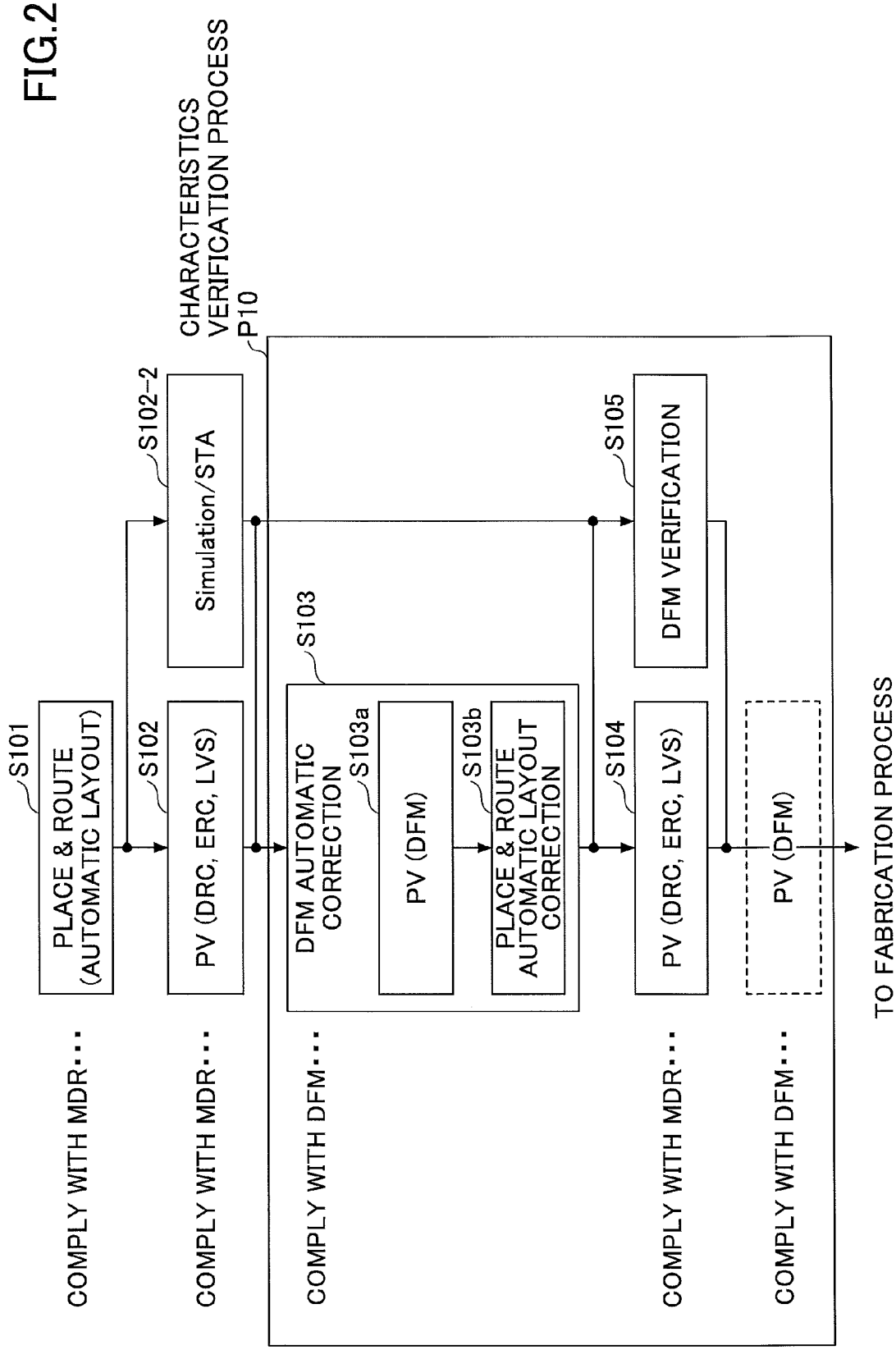
FIG. 2 is a diagram illustrating an outline of a characteristics verification process according to an embodiment.

FIG. 2 is a diagram illustrating an outline of the characteristics verification process according to the embodiment. In FIG. 2, a layout is automatically generated by placing and routing (P and R) cells based on data associated with an LSI such as a netlist indicating a connection relationship between cells (step S101).

Physical verification (PV) such as the design rule check (DRC), the electric rule check (ERC), and the layout versus schematic (LVS) verification between elements is conducted with respect to the layout information acquired after the placing and routing (P and R) (step S102). Further, a timing analysis such as an operation check and a timing violation check (a simulation/static timing analysis (simulation/STA)) is conducted by an engineer (step S102-2).

After the layout verification, a characteristics verification process P10 including steps S103 to S105 is executed. In the characteristics verification process P10, the layout information is automatically corrected by considering the variability in the LSI fabrication (step S103). In step S103, physical verification (PV) based on DFM (step S103a), and layout auto-correction (step S103b) that automatically corrects the layout information by changing the placing and routing (P and R) are conducted. There is no engineer's work. The verification in step S103 is called DFM auto-correction.

Then, the physical verification (PV) including the DRC, ERC, and LVS is conducted with respect to the corrected layout information, similar to step S102 (step S104).

In the present embodiment, a DFM determination process is conducted based on results of the timing analysis as criteria (step S105). The DFM determination process determines an effect due to a change in the timing characteristic after the DFM auto-correction. The timing analysis includes the operation check and the timing violation check (the simulation/static timing analysis (simulation/STA)) after DFM auto-correction.

When the DFM determination process determines that there is no effect due to a change in the timing characteristic after the DFM auto-correction, and the physical verification (PV) normally ends, an LSI is fabricated based on the design in the fabrication process.

In the above-described characteristics verification process P10 according to the present embodiment, since the timing characteristic after the DFM auto-correction is efficiently verified, it may be possible to improve the yield in the fabrication process. Further, it is not necessary to conduct the physical verification (PV) based on DFM in the characteristics verification process P9 in FIG. 1. Hence, it may be possible to improve the design TAT associated with DFM because the DFM auto-correction, by considering the variability in the fabrication process in step S103 and the DFM determination in step S105, does not include the engineer's work.

Figure 3:
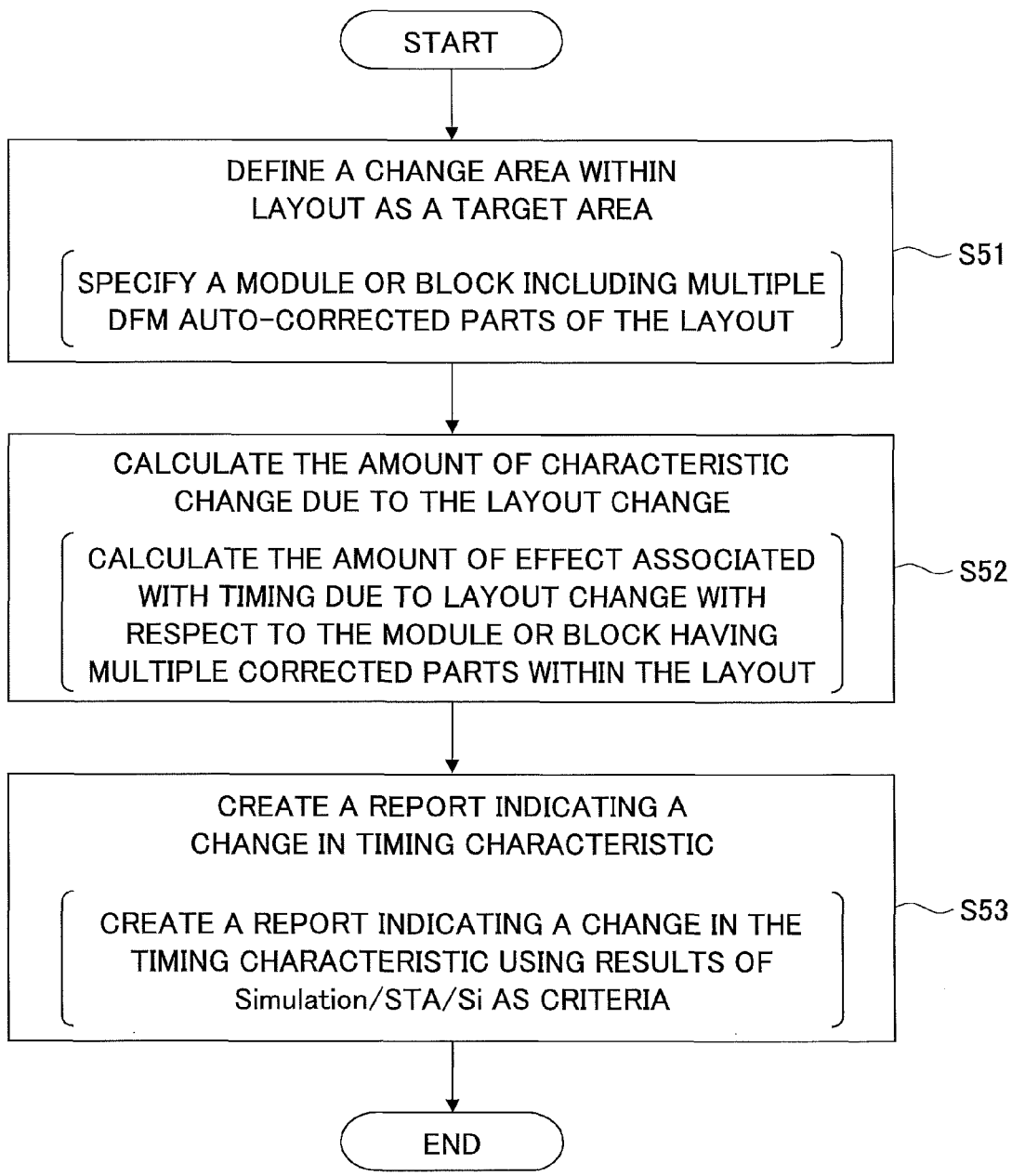
FIG. 3 is a diagram illustrating an outline of a DFM determination process in step S105.

FIG. 3 is a diagram illustrating an outline of the DFM determination process in step S105. In FIG. 3, the DFM determination process defines a change area within the layout as a target area subjected to the DFM determination (step S51). The DFM determination process specifies a module or block including multiple DFM auto-corrected parts of the layout (step S51).

Subsequently, the DFM determination process calculates the amount of characteristics change due to the layout change in the target area (step S52). The amount of characteristics change is obtained by calculating the amount of an effect associated with the timing caused by the layout change with respect to the module or block having multiple corrected parts within the layout.

Then, the DFM determination process determines acceptability with respect to the timing characteristic (step S53). The DFM determination process determines the acceptability based on the change in the timing characteristic using results of the timing analysis such as an LSI operation check and the timing violation check (the simulation/static timing analysis (simulation/STA)) as criteria. The DFM determination process ends thereafter.

Figure 4:
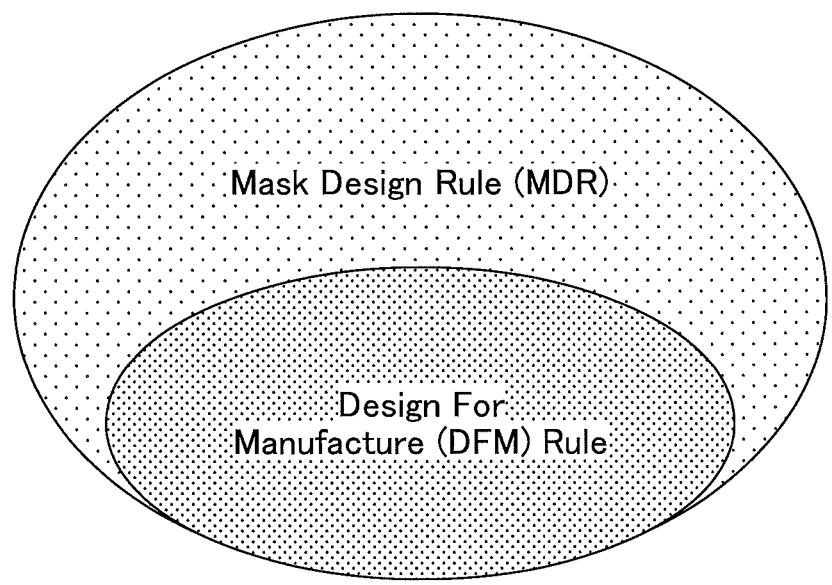
FIG. 4 is a diagram illustrating an inclusive relationship between a mask design rule (MDR) and a design for manufacturing (DFM)

FIG. 4 is a diagram illustrating an inclusive relationship between MDR and DFM. As illustrated in FIG. 4, a DFM rule is included in MDR. That is, the design that satisfies the DFM rule may be able to reduce the variability in the fabrication process to improve the yield.

In the characteristics verification process P10 according to the embodiment illustrated in FIG. 1, the processes complying with MDR and DFM are conducted, and thus, the characteristics verification process P10 may be able to reduce the variability in the fabrication process. Accordingly, the characteristics verification process P10 may be able to improve the yield.

Figure 5:
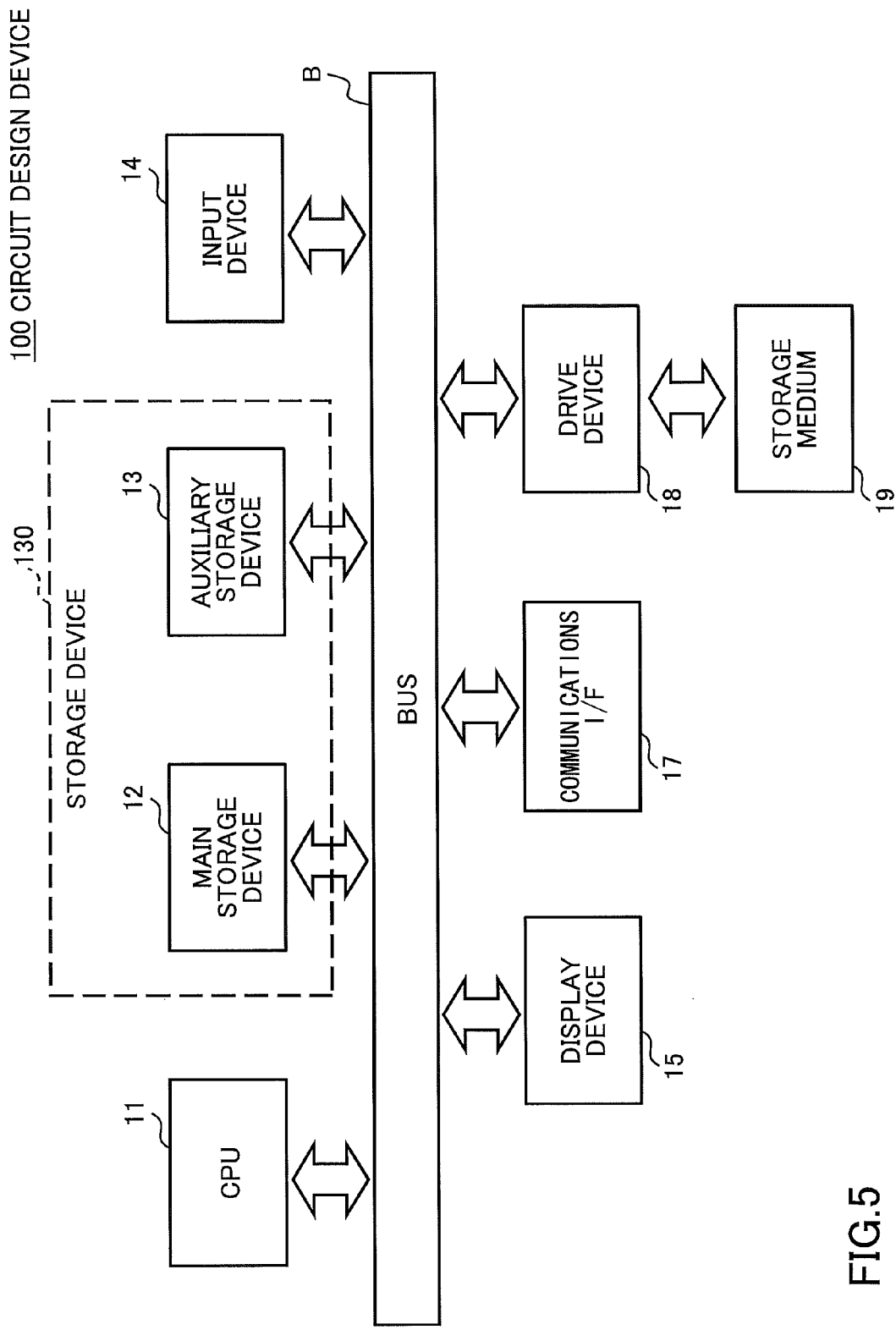
FIG. 5 is a diagram illustrating a hardware configuration of the circuit design apparatus according to the embodiment.

A circuit design apparatus that performs processes associated with a circuit design including the characteristics verification process P10 is a computer-aided design (CAD) apparatus, and includes a hardware configuration illustrated in FIG. 5.

FIG. 5 is a diagram illustrating a hardware configuration of the circuit design apparatus according to the embodiment. In FIG. 5, a circuit design apparatus 100 that is controlled by a computer includes a central processing unit (CPU) 11, a main storage device 12, an auxiliary storage device 13, an input device 14, a display device 15, a communications interface (I/F) 17, and a drive device 18 that are connected to a bus B.

The CPU 11 is configured to control the circuit design apparatus 100 in accordance with programs stored in the main storage device 12. The main storage device 12 may be formed of a random access memory (RAM), a read-only memory (ROM), and the like, and is configured to store or temporarily store programs executed by the CPU 11, data necessary for the process in the CPU 11, data obtained as a result of the process, and the like.

The auxiliary storage device 13 may be formed of a hard disk drive (HDD), or the like, and is configured to store data such as the programs for executing various types of processes. Some of the programs stored in the auxiliary storage device 13 are loaded into the main storage device 12, and the loaded programs are executed by the CPU 11 to implement various types of processes. A storage part 130 includes the main storage device 12 and/or the auxiliary storage device 13.

The input device 14 includes a mouse, a keyboard, and the like, and is used by a user to input information required for the processes performed by the circuit design apparatus 100. The display device 15 is configured to display various types of information under the control of the CPU 11. The communications I/F 17 is configured to perform communications via a wired or wireless network. The communications performed via the communications I/F 17 are not limited to the wireless or wired communications. The circuit design apparatus 100 may be provided with programs implementing processes performed by the circuit design apparatus 100 via a storage medium 19 such as a compact disc read-only memory (a CD-ROM) or the like. The drive device 18 serves as an interface between the storage medium 19 (e.g. a CD-ROM) set in the drive device 18 and the circuit design apparatus 100.

Further, the storage medium 19 is configured to store programs implementing later-described various types of processes according to the embodiment. The programs stored in the storage medium 19 are installed in the circuit design apparatus 100 via the drive device 18. The installed programs are configured to be executed by the circuit design apparatus 100.

Note that a medium storing the programs is not limited to the CD-ROM, and such medium may be any medium that is readable by a computer. Examples of such a computer-readable medium include a portable recording medium such as a DVD disk, a USB memory, and the like, or a semiconductor memory such as flash memory, and the like in addition to the CD-ROM.

Figure 6:
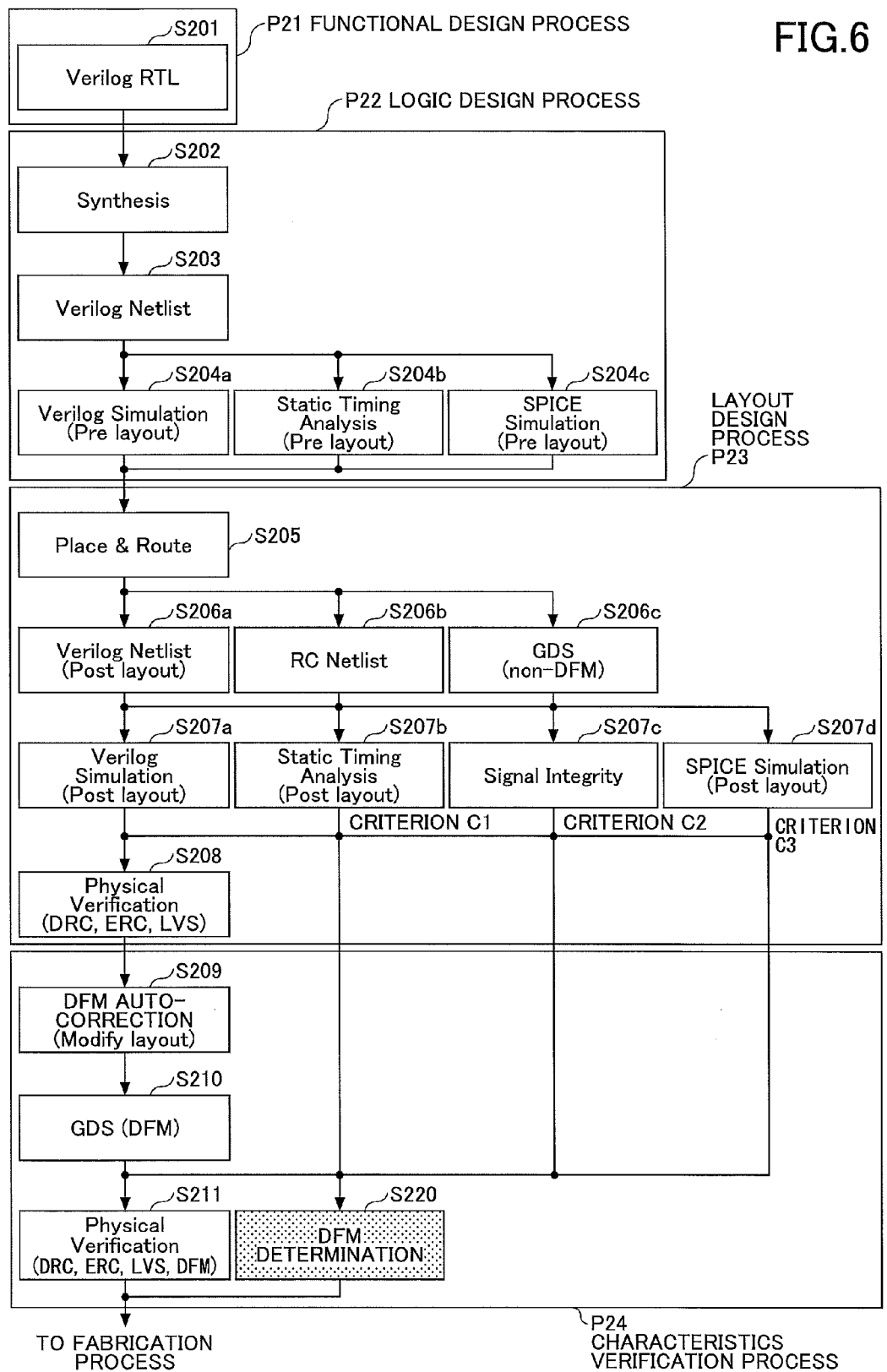
FIG. 6 is a flowchart illustrating an overall circuit design process in the embodiment.

FIG. 6 illustrates an example of the circuit design process that considers the variability in the fabrication process. FIG. 6 is a flowchart illustrating an overall circuit design process in the embodiment.

In FIG. 6, the circuit design process performed by the circuit design apparatus 100 includes a functional design process P21, a logic design process P22, a layout design process P23, and a characteristics verification process 24. These processes P21 to P24 may be implemented by the execution of the programs handled by the CPU 11.

The functional design process P21 is conducted in step S201. In step S201, the functional design of the LSI is conducted by the engineer using a hardware description language such as Verilog RTL or the like. Verilog RTL data created by the engineer are stored in the storage part 130.

Subsequently, the logic design process P22 is executed by reading the Verilog RTL data from the storage part 130. The logic design process P22 is conducted by performing steps S202, S203, and S204a to S204c.

In step S201, a logic synthesis is conducted using the Verilog RTL data. Further, in step S203, a netlist (Verilog netlist) indicating connection information between modules or blocks based on the Verilog RTL data is created and stored in the storage part 130.

The pre-layout logic design process P22 is conducted in steps S204a to S204c. In step S204a, connection verification is conducted by Verilog-based simulation (Verilog simulation) using the netlist (Verilog netlist). In step S204b, timing verification of a digital circuit is conducted (static timing analysis). In step S204c, analog operation verification is conducted using Simulation Program with Integrated Circuit Emphasis (SPICE), or the like (SPICE simulation).

When the logic design process P22 detects an error in at least one of the processes in steps S204a to S204c, the engineer reviews the design, whereas when the logic design verification terminates normally, the subsequent layout design process P23 is conducted.

The layout design process P23 is conducted in steps S205, S206a to S206c, S207a to S207d, and S208. In step S205, placing and routing (P and R) is conducted.

In step S206a, a netlist indicating connection information between cells based on the placing and routing (P and R) is output. That is, the netlist (Verilog netlist) associated with the cells within the storage part 130 generated in step S203 is updated.

In step S206*b*, an RC netlist associated with parasitic capacitance is generated by extraction of the parasitic capacitance for each of the nets. The RC netlist associated with parasitic capacitance is stored in the storage part 130.

In step S206*c*, a layout is described in a graphic design standard (GDS) format. The GDS data representing the layout (layout information) is stored in the storage part 130. The GDS data indicates a layout that does not consider the variability in the fabrication process before DFM auto-correction.

The verification of the designed layout is then conducted insteps S207*a* to S207*d* using the data obtained in steps S206*a* to S206*c*.

In step S207*a*, the verilog-based simulation is conducted based on the netlist (Verilog netlist) associated with the laid out cells (post layout) and the RC netlist associated with the parasitic capacitance.

In step S207*b*, the connection verification is performed by the verilog-based simulation (Verilog simulation) based on the netlist (Verilog netlist) associated with the laid out cells (post layout) and the RC netlist associated with the parasitic capacitance. An STA timing report is output based on the connection verification in step S207*b*. A criterion C1 may be obtained from the STA timing report. The criterion C1 indicates a net name, a cell name, cell delay information, a timing check result, net parasitic RC information, and the like.

In step S207*c*, verification of digital signal waveform quality or digital signal integrity (signal integrity) is conducted. A criterion C2 may be obtained based on analog operation verification in step S207*c*. The criterion C2 indicates a net name, a cell name, a crosstalk/noise dependent delay variation, and the like.

In step S207*d*, the analog operation after the layout is verified using SPICE, or the like (SPICE simulation). A criterion C3 may be obtained based on the analog operation verification in step S207*d*. The criterion C3 indicates transistor transient response information, and the like.

In step S208, physical verification (PV) such as the design rule check (DRC), the electric rule check (ERC), and the layout versus schematic (LVS) verification between elements is conducted with respect to the layout after the placing and routing (P and R).

When the PV conducted with respect to the layout after the placing and routing (P and R) ends, the characteristics verification process P24 is conducted in steps S209 to S220. In step S209, DFM auto-correction is conducted to change the layout such that the variability in the fabrication process is reduced.

In step S210, a layout is described in a graphic design standard (GDS) format. The GDS data representing the layout (layout information) are stored in the storage part 130. The GDS data indicate a layout that considers the variability in the fabrication process after DFM auto-correction.

In step S211, physical verification (PV) such as the design rule check (DRC), the electric rule check (ERC), and the layout versus schematic (LVS) verification between elements is conducted with respect to the layout that considers the variability in the fabrication process.

In step S220, a DFM determination process is conducted based on results of the timing analysis as criteria. The DFM determination process determines an effect due to a change in the timing characteristic after the DFM auto-correction. The timing analysis includes the operation check and the timing violation check (the simulation/static timing analysis (simulation/STA)) after DFM auto-correction.

When the DFM determination process determines that there is no effect due to a change in the timing characteristic after the DFM auto-correction, and the physical verification (PV) normally ends, an LSI is fabricated based on the design in the fabrication process.

Figure 7:
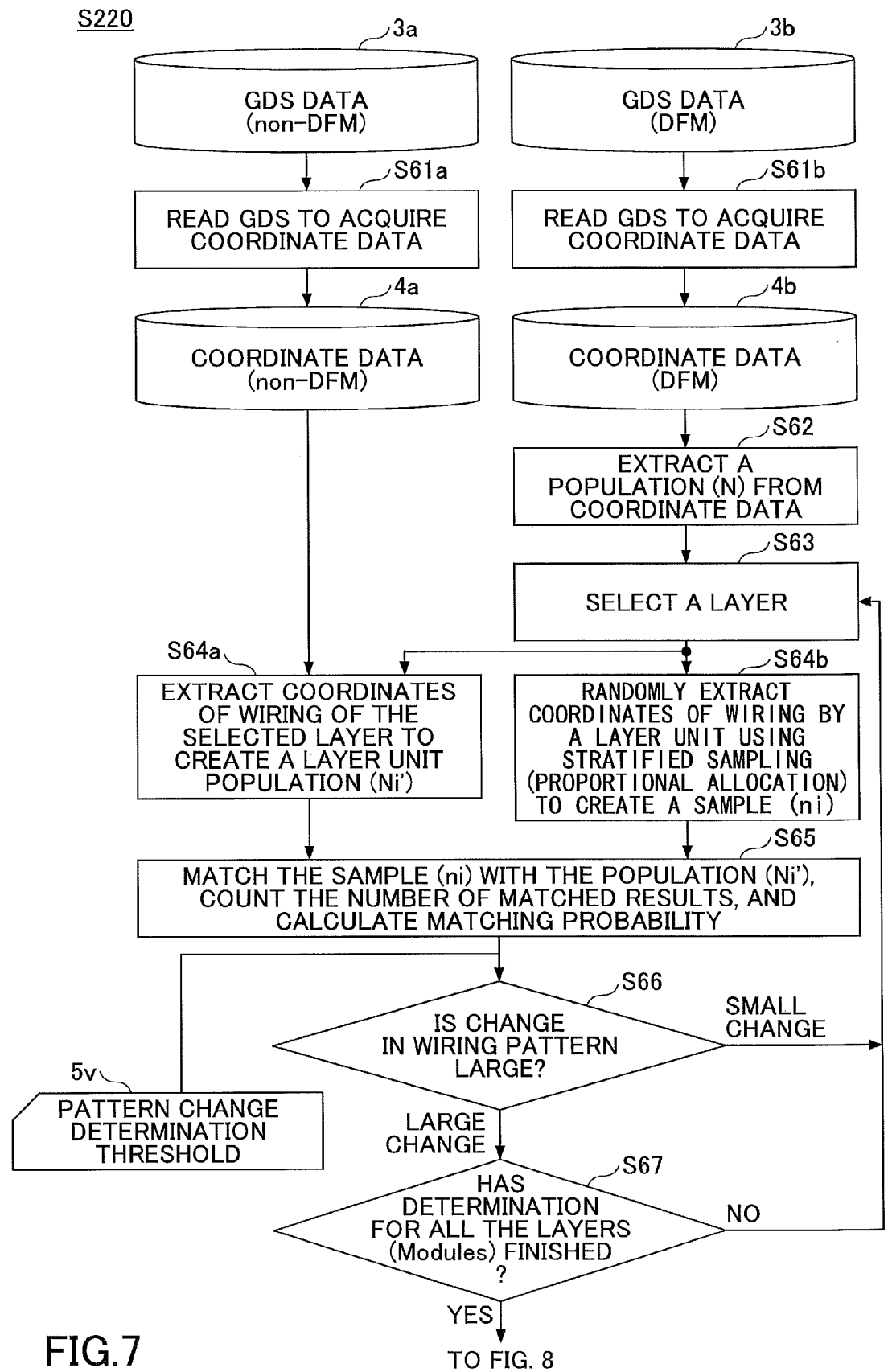
FIG. 7 is a flowchart illustrating a DFM determination process in step S220.
Figure 8:
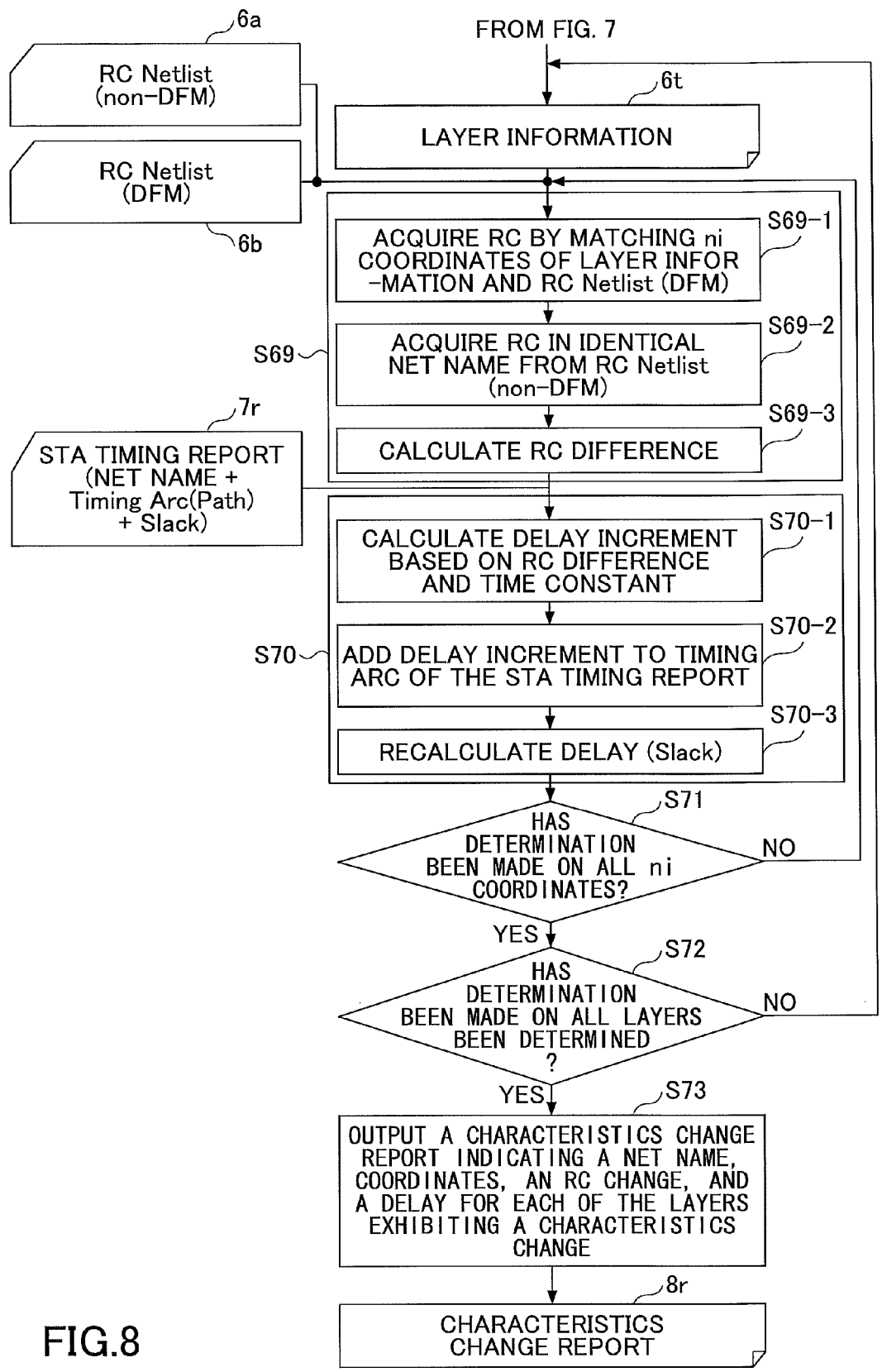
FIG. 8 is a flowchart illustrating the DFM determination process in step S220.

FIGS. 7 and 8 are flowcharts illustrating the DFM determination process in step S220. In FIG. 7, GDS data 3*a* correspond to the layout information obtained before the DFM auto-correction, which is created in step S206*c*. Similarly, GDS data 3*b* correspond to the layout information obtained after the DFM auto-correction, which is created in step S210.

In FIG. 7, the DFM determination process in step S220 reads the GDS data 3*a* from the storage part 130, and acquires coordinate data 4*a* of all the patterns of metal wiring within the LSI before the DFM auto-correction from the GDS data 3*a* (step S61*a*). The acquired coordinate data 4*a* are stored in the storage part 130.

Further, the DFM determination process reads the GDS data 3*b* from the storage part 130, and acquires coordinate data 4*b* of all the patterns of metal wiring within the LSI after the DFM auto-correction from the GDS data 3*b* (step S61*b*). The acquired coordinate data 4*b* are stored in the storage part 130.

The DFM determination process extracts a population (N) from the coordinate data 4*b* after the DFM auto-correction (step S62). Then, the DFM determination process selects one layer from the GDS data 3*b* after the DFM auto-correction (step S63). The layer corresponds to a module or a block.

The DFM determination process extracts coordinates of wires of the layer selected in step S63 to create a layer unit population (Ni') (step S64*a*). Further, the DFM determination process randomly extracts coordinates of wires by a layer unit using stratified extraction (proportional allocation) to create a sample (ni) (step S64*b*).

When the DFM determination process extracts the population (Ni') and the sample (ni), the DFM determination matches the sample (ni) with the population (Ni'), counts the number of matched results (matched number), and calculates matching probability (step S65). The matching probability is computed by the following equation.

$$\text{Matching Probability} = \{1 - (\text{Sample } (ni) \text{ before DFM auto-correction}/\text{Population } (Ni') \text{ after DFM auto-correction})\} \times 100$$

The matching probability may indicate a level of change in the wiring pattern in the layer.

The DFM determination process then acquires a pattern change determination threshold 5*v* set in advance from the storage part 130, and determines whether the change in the wiring pattern is greater than the pattern change determination threshold 5*v* (step S66). That is, whether the matching probability is greater than the pattern change determination threshold 5*v* is determined.

When the matching probability is less than or equal to the pattern change determination threshold 5*v*, the DFM determination process determines that the change in the wiring pattern is small, and returns to step S63 to repeat the above described processes by selecting a next layer.

On the other hand, when the matching probability is greater than the pattern change determination threshold 5*v*, the DFM determination process determines that the change in the wiring pattern is large, and stores the sample (ni) in the storage part 130 for each of the layers. Pointers indicating the sample (ni) may be stored in the storage part 130. The DFM determination process determines whether determination for all the layers has ended (step S67). When the determination has not ended for all the layers yet, the DFM determination process returns to step S63 to repeat the above-described processes by selecting a next layer.

On the other hand, when the determination has ended for all the layers, the DFM determination process processes step S69 in FIG. 8. Layer information 6t (FIG. 8) indicates a sample (ni) in each of the layers having a large change in the wiring pattern maintained in the storage part 130.

In FIG. 8, the DFM determination process performs an RC difference acquisition process to acquire information indicating an RC difference between before and after the DFM auto-correction using the layer information 6t, the RC netlist 6a associated with the parasitic capacitance acquired in the step S206b in FIG. 6, and the RC netlist 6b acquired after the DFM auto-correction (step S69).

The DFM determination process sequentially selects layers from the layer information 6t, reads a sample (ni) in the selected one of layers, performs the following steps S69 and S70 on each of the wiring pattern coordinates included in the sample (ni). Further, when the DFM determination process ends processes for all the wiring pattern coordinates within the sample of the selected layer, the DFM determination process selects a next layer from the layer information 6t to repeat similar processes for each of the wiring pattern coordinates included in the sample (ni) of the next layer.

The sample (ni) represents a set of coordinates of i wires randomly selected from the nth layer. When the expression "ni coordinates" indicates coordinates of any one of the 1 to i wires within the sample (ni) of the nth layer.

The difference acquisition process (step S69) of the DFM determination process includes step S69-1 for acquiring the RC in the layer having a large change in the wiring pattern of the layout after the DFM auto-correction, step S69-2 for acquiring the RC in the identical net in the layout before the DFM auto-correction, and step S69-3 for acquiring information indicating the difference between RCs (RC difference).

In step S69-1, the difference acquisition process matches the ni coordinates within the sample (ni) of the layer information 6t and the RC netlist 6b after the DFM auto-correction, and acquires the RC corresponding to the wire within the layer having a large change in the wiring pattern. The net name corresponding to the ni coordinates within the sample (ni) of the layer information 6t is acquired from the Verilog netlist after the DFM auto-correction. The RC corresponding to the ni coordinates is acquired from the RC netlist 6b after the DFM auto-correction using the acquired net name.

In step S69-2, the difference acquisition process acquires the RC in the identical net name from the RC netlist 6a before the DFM auto-correction. In step S69-3, the difference acquisition process calculates the difference between the RC acquired in step S69-1 and the RC acquired in step S69-2 to acquire information indicating the RC difference.

Subsequently, the difference acquisition process performs a report update process to update an STA timing report 7r based on the RC difference information (step S70).

The report update process (step S70) of the DFM determination process includes step S70-1 for calculating a delay increment, step S70-2 for adding the delay increment to the STA timing report information 7r, and step S70-3 for recalculating delay (slack) based on the delay increment.

In step S70-1, the report update process calculates a delay increment based on the RC difference information and time constant for each of the nets of the layers having a large change in the wiring pattern of the layout after the DFM auto-correction. In step S70-2, the report update process adds the delay increment to a timing arc (delay path) of the STA timing report 7r. In step S70-3, the report update process recalculates delay (slack) based on the delay increment, and updates the STA timing report 7r.

When the report update process updates the STA timing report 7r, the DFM determination process determines whether the determination is made on all the ni coordinates (step S71). When the DFM determination process has not finished for all the ni coordinates yet, the DFM determination process returns to step S69 to repeat the above-described processes for a next layer.

On the other hand, when the DFM determination process has finished for all the ni coordinates, the DFM determination process further determines whether the determination is made on all the layers (step S72). When the DFM determination process has not finished for all the layers, the DFM determination process acquires a next layer from the layer information 6t to repeat the above-described processes from step S69.

When the DFM determination process has finished for all the layers, the DFM determination process outputs a characteristics change report 8r indicating a net name, coordinates, RC change, and delay for each of the layers exhibiting a characteristics change (step S73). The characteristics change report 8r is stored in the storage part 130. Further, the characteristics change report 8r may be displayed on the display device 15.

Next, exemplified processes from steps S61a and S61b to S65 of FIG. 7 are illustrated with reference to FIGS. 9 to 12.

Figure 9:
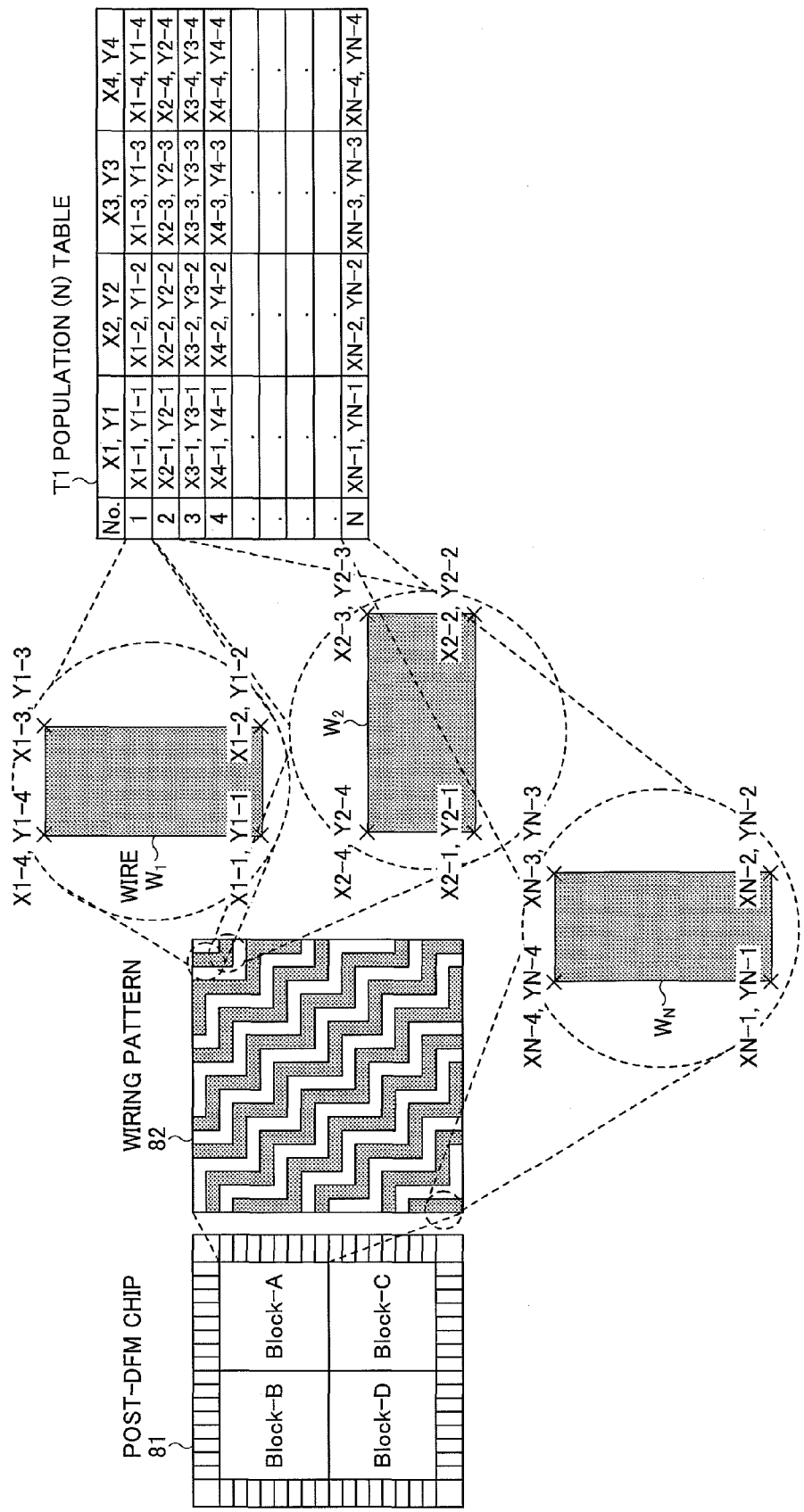
FIG. 9 is a diagram illustrating an exemplified process of step S62 in FIG. 7.

FIG. 9 is a diagram illustrating an exemplified process of step S62 in FIG. 7. In FIG. 9, a post-DFM chip 81 represented by the layout after the DFM includes four blocks, that is, Block-A, Block-B, Block-C, and Block-D that are placed and routed.

A population (N) table T1 is created by extracting coordinate data of wires associated with a wiring pattern 82 of the post-DFM chip 81 from the coordinate data 4b. The population (N) table T1 indicates coordinates of the N wires W1, W2, . . . WN of the wiring pattern 82.

Figure 10:
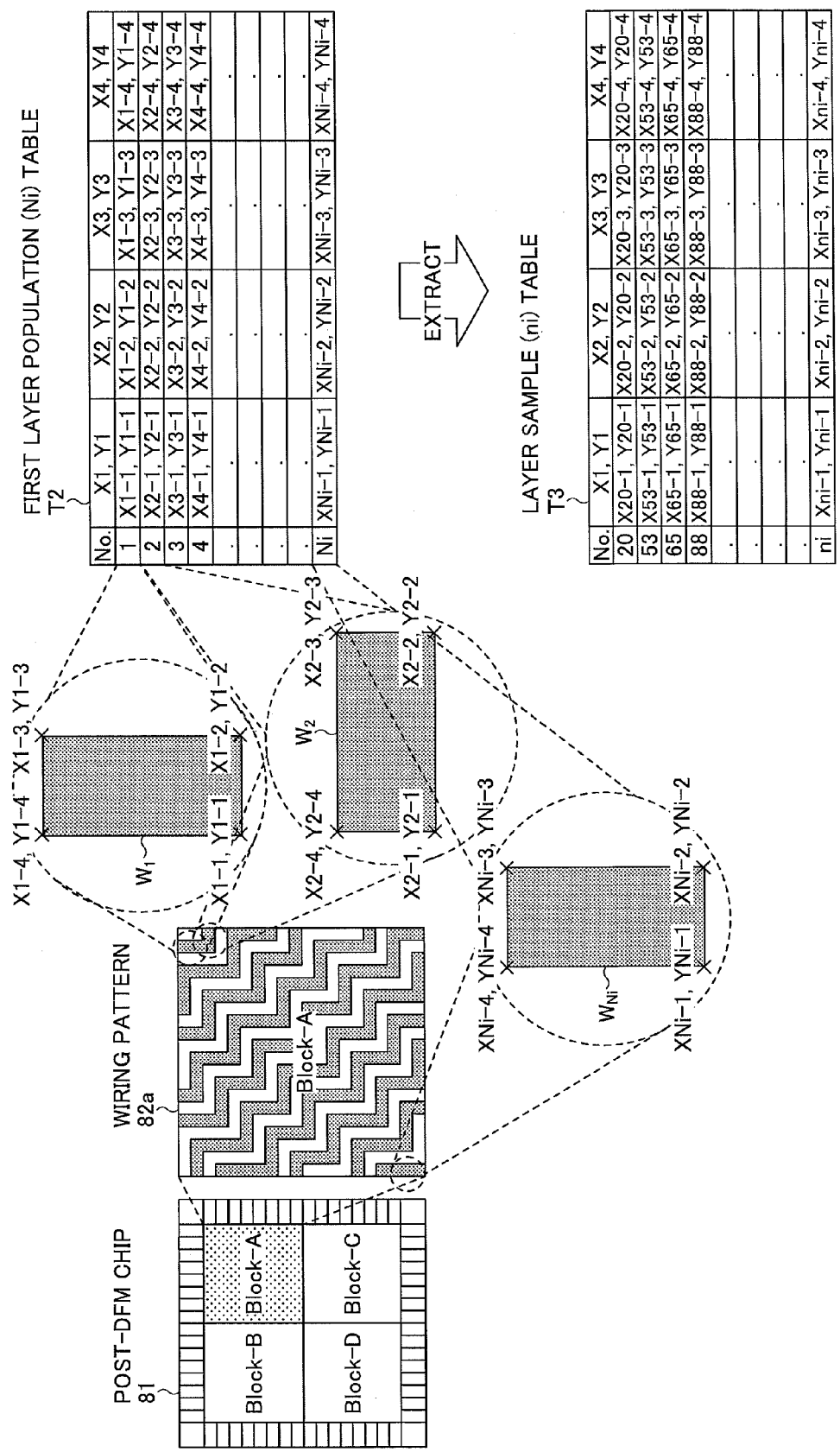
FIG. 10 is a diagram illustrating exemplified processes of step S63 and S64b in FIG. 7.

FIG. 10 is a diagram illustrating exemplified processes of step S63 and S64b in FIG. 7. In FIG. 10, Block-A of the post-DFM chip 81 is selected. A first layer population (Ni) table T2 is created by extracting coordinate data of wires associated with a wiring pattern 82a if the selected Block-A. The first layer population (Ni) table T2 indicates coordinates of the Ni wires W1, W2, . . . WNi of the wiring pattern 82a.

Then, a layer sample (ni) table T3 is created by randomly selecting ni coordinates from the first layer population (Ni) table T2. The proportional allocation represented by the following equation (1) is used to extract a sample from each layer.

$$_NCn = \frac{N!}{n!*(N-n)!} \quad \begin{array}{l} N: \text{Population} \\ n: \text{Sample} \end{array} \quad (1)$$

$$ni = \frac{n*Ni}{N} \quad \begin{array}{l} Ni: \text{Layer Population} \\ ni: \text{Layer Sample} \end{array}$$

In the proportional allocation, the number of samples are allocated in proportion to the size of each layer. However, the number of samples may be acquired from the engineer.

Figure 11:
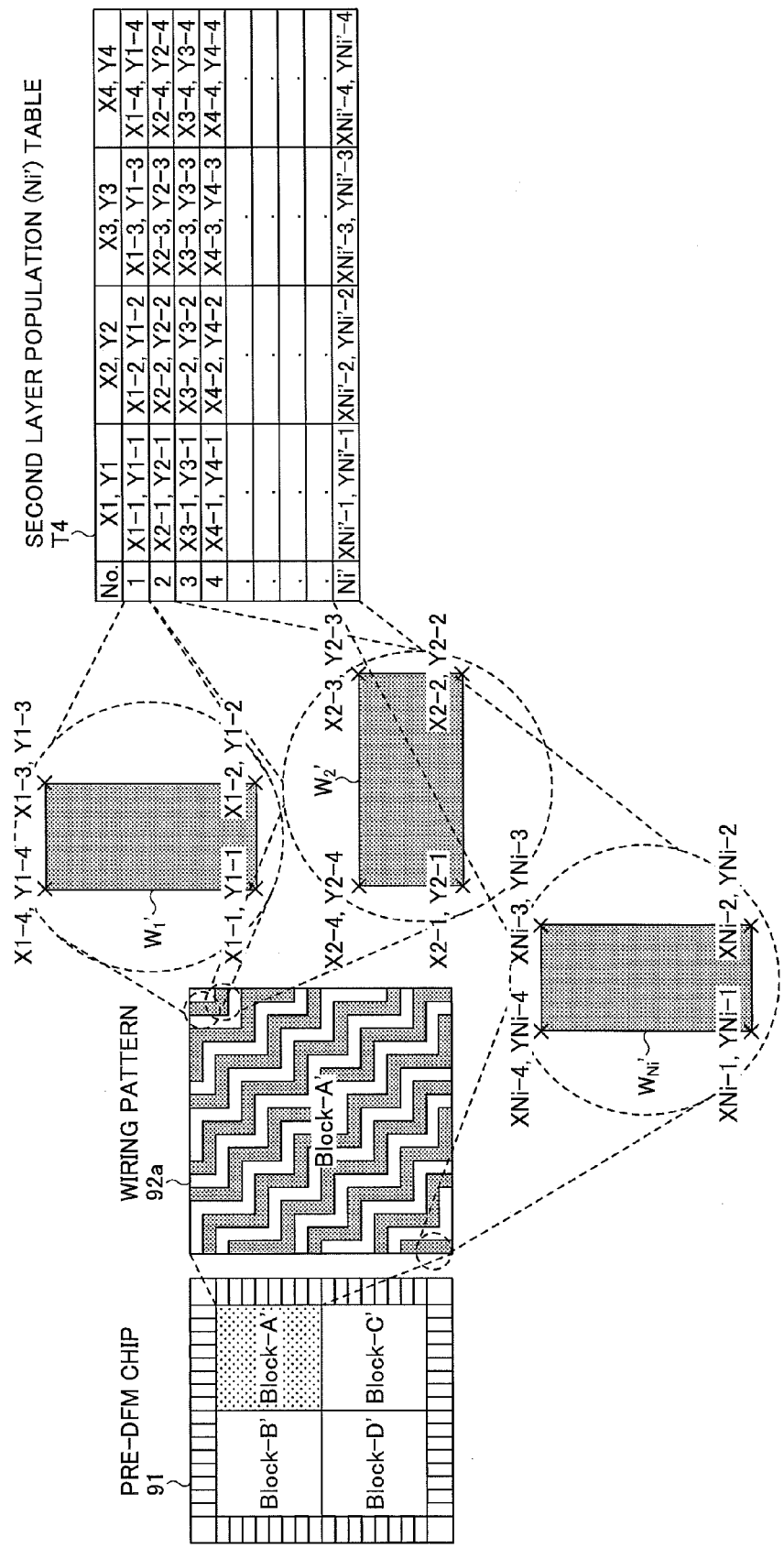
FIG. 11 is a diagram illustrating an exemplified process of step S64a in FIG. 7.

FIG. 11 is a diagram illustrating an exemplified process of step S64a in FIG. 7. In FIG. 11, a pre-DFM chip 91 represented by the layout before the DFM includes four blocks, that is, Block-A', Block-B', Block-C', and Block-D' that are placed and routed.

A population (Ni') table T4 is created by extracting coordinate data of wires associated with a wiring pattern 92a of the Block-A' corresponding to the Block-A selected with respect to the post-DFM chip 81 from coordinate data 4a of the pre-DFM chip 91. The population (Ni') table T4 indicates coordinates of the Ni wires W1, W2, . . . WNi of the wiring pattern 92.

FIG. 12 is a diagram illustrating an exemplified process of step S65 in FIG. 7. In FIG. 12, the number of matched results (the number of matches) is counted by matching the layer sample (ni) table T3 with the second layer population (Ni') table T4.

The matching probability is computed by calculating the number of matched results with respect to the number of records (the number of wires) in the layer sample (ni) table T3. When the matching probability is greater than the pattern change determination threshold 5v, a change in the corresponding layer (Block-A in this case) is determined as large. Hence, identification information of the layer (Block-A in this case) and the corresponding layer sample (ni) table T3 are recorded in the layer information 6t. The layer information 6t may store pointers indicating the layer sample (ni) table T3.

An illustration is given of data being referred to in steps S69 to S73 of FIG. 8 with reference to a circuit configuration example within a block in FIGS. 13 to 16.

Figure 13:
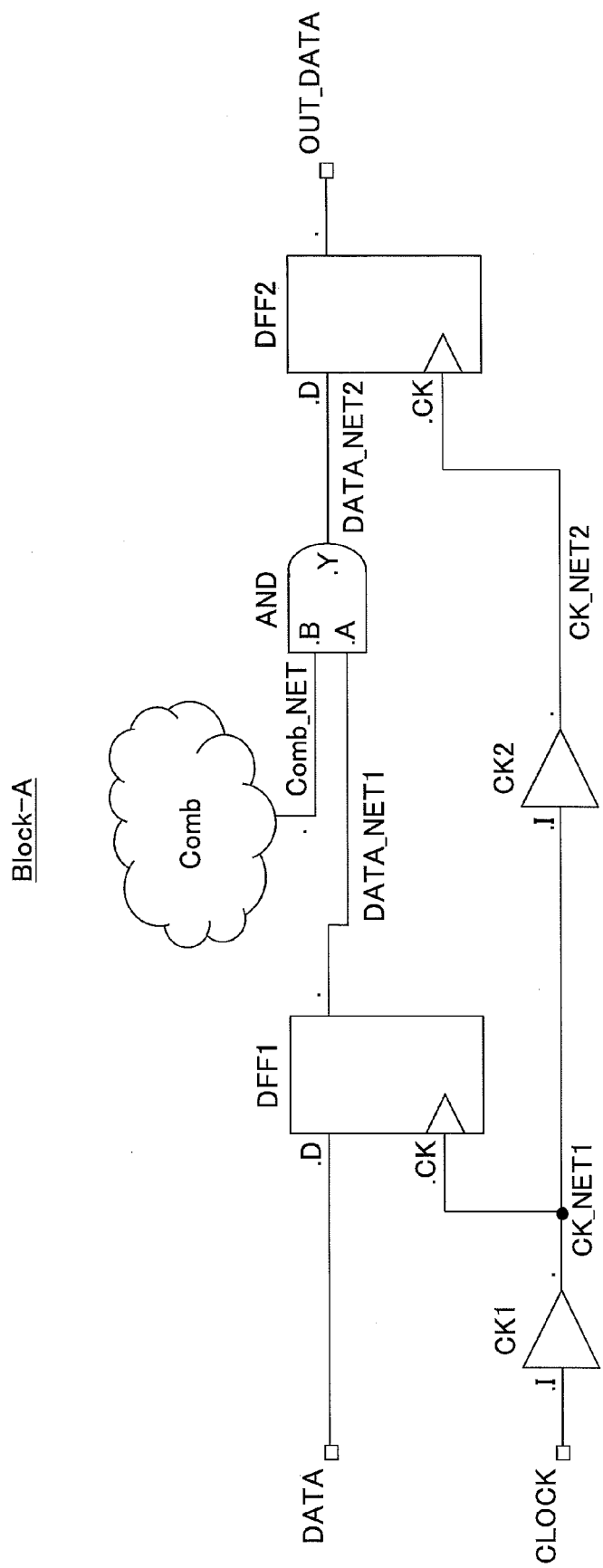
FIG. 13 is a diagram illustrating a circuit configuration example within a block.

FIG. 13 is a diagram illustrating the circuit configuration example within the block. In the following illustration, the circuit configuration example illustrated in FIG. 13 represents a circuit configuration of Block-A after the DFM.

The Block-A includes input terminals DATA and CLOCK, and an output terminal OUT_DATA. The Block-A includes cells CK1 and CK2, cells DFF1 and DFF2, a cell AND, and a cell Comb that are placed and routed. A Verilog netlist associated with connection information within the Block-A is illustrated in FIG. 14.

FIG. 14 is a diagram illustrating an example of the Verilog netlist. In FIG. 14, one module is described within the Block-A, which represents an example of the Verilog netlist after the DFM.

DATA and CLOCK are defined as input terminals, and OUT_DATA is defined as an output terminal. Further, CK_NET1, DATA_NET1, Comb_NET, DATA_NET2, and CK_NET2 are defined as metal wires.

Further, the connections between cells are defined. The cell CK1 is a clock buffer CK_BUF. The input terminal I is connected from the Block-A input terminal CLOCK, and the output terminal O is connected to the CK_NET1.

The cell DFF1 is a flipflop. The data input terminal D is connected from the Block-A data input terminal DATA, and the clock input terminal CK is connected to the CK_NET1. Further, the data output terminal Q is connected to the CK_NET1. The cell Comb is a combinational circuit. The output terminal O is connected to the Comb_NET.

The cell AND is an AND circuit. The input terminal A is connected to the DATA_NET1 to input data from the cell DFF1. The input terminal B is connected to the Comb_NET. The output terminal Y is connected to the DATA_NET2. The cell CK2 is a clock buffer CK_BUF. The input terminal I is connected to the CK_NET1, and the output terminal O is connected to the CK_NET2.

The cell DFF2 is a flipflop. The data input terminal D is connected to the DATA_NET2, and the clock input terminal CK is connected to the CK_NET2. Further, the data output terminal Q is connected to the Block-A output terminal OUT_DATA.

FIG. 15 is a diagram illustrating an example of the RC netlist. FIG. 15 is a description example indicated in a standard parasitic exchange format (SPEF) associated with DATA_NET1 within the Block-A after the DFM illustrated in FIG. 13 of the RC netlist 6b after the DFM.

In the description example of FIG. 15, a total capacity from "*D_NET DATA_NET1 10.10" to DATA_NET1 is "10.10". A pin name (i.e., a cell name in this case) listed in "*CONN" indicates that the DATA_NET1 is a net connecting the cell AND and the cell DFF1.

The description "*CAP" indicates that there are five parasitic capacitances each having "2.2" in DATA_NET1. The parasitic capacitance is divided by DATA_NET1, each of which indicates a corresponding one of the divided parasitic capacitances. The description "*RES" indicates that the resistance "20" is present in each case from the cell AND to the DATA_NET1, in four of DATA_NET1, and from DATA_NET1 to the cell IDFF1.

The parasitic capacitance and resistance for the RC net list 6a before the DFM are also indicated in a similar format. Hence, RC difference information may be acquired based on the RC netlist 6a before the DFM and the RC netlist 6b after the DFM. In this embodiment, the RC difference information is acquired corresponding to the net exhibiting a large change. The delay (slack) after the DFM is calculated corresponding to the net exhibiting a large change by using the RC difference information.

Next, a description is given of a partial example of the characteristics change report 8r. FIG. 16 is a diagram illustrating a partial example of the characteristics change report 8r. FIG. 16 indicates a part of the characteristics change report 8r associated with the Block-A. The characteristics change report 8r includes "Incr" indicating delay at each point, and "Path" indicating accumulated delay that is accumulated every time the corresponding point passes.

The characteristics change report 8r further includes, in association with the Block-A, time (data arrival time) indicating the time in which a data signal input from the input terminal DATA reaches the data input terminal D of the cell DFF2, and time (data required time) indicating the time in which a clock signal input from the input terminal CLOCK reaches the clock input terminal CK of the cell DFF2.

The acceptability of the layout change with respect to the timing characteristics change after the DFM is determined based on the characteristics change report 8r including the above information.

Figure 17A:
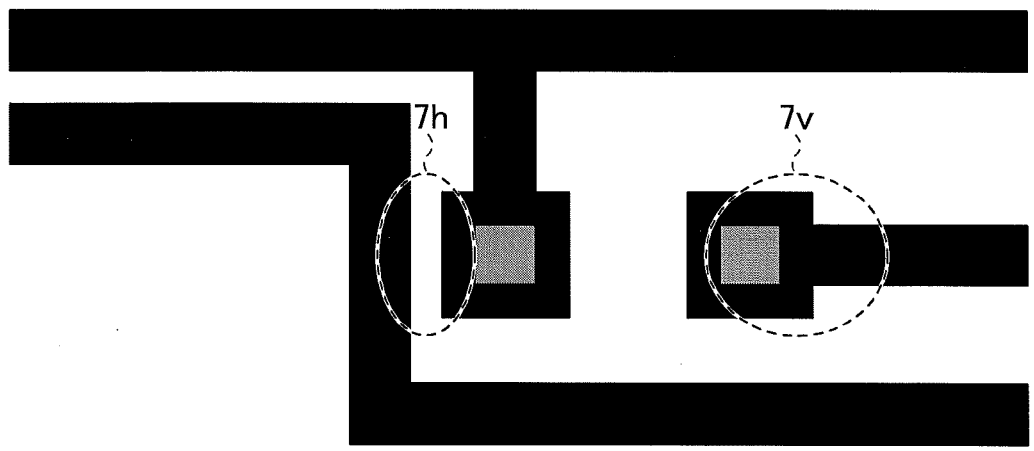
FIGS. 17A and 17B are diagrams illustrating modifications of a wiring layout before and after the DFM.
Figure 17B:
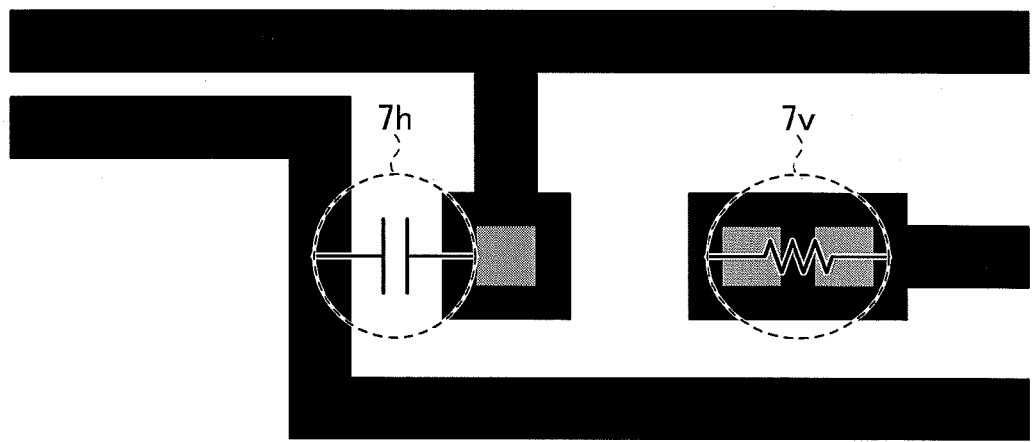

Next, a description is given of a modification of a wiring layout in accordance with the DFM with reference to FIGS. 17A and 17b. FIGS. 17A and 17B are diagrams illustrating the modifications of the wiring layout before and after the DFM. FIG. 17A indicates the wiring layout before the DFM, which exemplifies a correction part 7h serving as a possible hotspot, and a correction part 7v having resistance. The correction parts 7h and 7v may be subjected to auto-correction by the DFM.

FIG. 17B illustrates the wiring layout after the DFM. In the correction part 7h, a wiring interval is expanded, and in the correction part 7v, a via hole is added. As a result, a coupling capacitance is reduced in the correction part 7h, and the resistance is reduced in the correction part 7v.

Although the constraint is satisfied as an overall layer, operations may be adversely affected by unexpected noise in a case where a digital circuit is disposed close to an analog circuit. Hence, in the present embodiment, effects caused by the DFM auto-correction on parts corrected after the DFM such as the correction part 7h and the correction part 7v may be detected by extracting the RC difference information.

Figure 18:
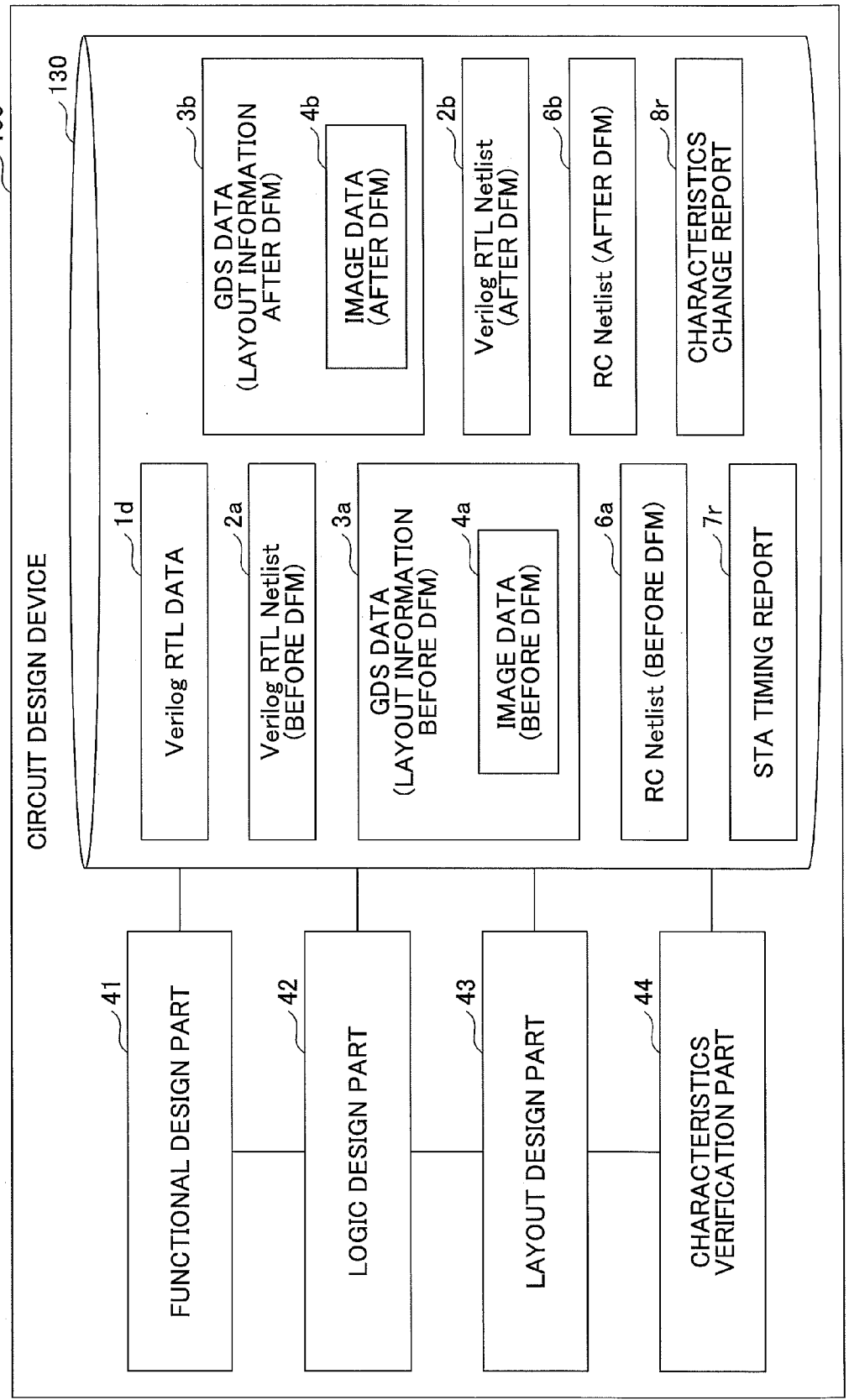
FIG. 18 is a diagram illustrating a functional configuration example of the present embodiment.

A functional configuration of a circuit design including the characteristics verification process P24 after the above-described layout modification may be described as illustrated in FIG. 18.

FIG. 18 is a diagram illustrating a functional configuration example of the present embodiment. In FIG. 18, a circuit design apparatus 100 includes a functional design part 41, a logic design part 42, a layout design part 43, and a characteristics verification part 44.

Further, the storage part 130 stores Verilog RTL data 1d, a Verilog netlist 2a before the DFM, GDS data 3a before the DFM, an RC netlist 6a before the DFM, and an STA timing report 7r. The storage part 130 further stores GDS data 3b after the DFM, an RC netlist 6b after the DFM, a characteristics change report 8r.

The functional design part 41 is configured to assist the engineer in functional design of LSI with a hardware description language. The functional design part 41 is configured to conduct the functional design process P21 illustrated in FIG. 6. The Verilog RTL data 1d created based on the functional design are stored in the storage part 130.

The logic design part 42 is configured to synthesize logic to create a Verilog netlist 2a before the DFM, and conduct logical verification before the layout. The logic design part 42 is configured to conduct the logic design process P22 illustrated in FIG. 6. The Verilog netlist 2a created by the logic design part 42 is stored in the storage part 130.

The layout design part 43 conducts verification after the layout based on the Verilog net list 2a and the placed and routed layout information. The layout design part 43 is configured to conduct the layout design process P23 illustrated in FIG. 6. The storage part 130 stores the GDS data 3a before the DFM created by the layout design part 43, the RC netlist 6a, the STA timing report 7r, and the like.

The characteristics verification part 44 is configured to execute the DFM auto-correction considering the variability in the fabrication process, and execute physical verification (step S211 in FIG. 6) on the corrected layout, and characteristics verification (step S220: DFM determination in FIG. 6). The characteristics verification part 44 corresponds to a verification apparatus.

The GDS data 3b after the DFM obtained by the DFM auto-correction are stored in the storage part 130. Further, the Verilog netlist 2b after the DFM obtained by the layout correction is stored in the storage part 130. Further, the RC netlist 6b after the DFM obtained by the physical verification is stored in the storage part 130. In addition, the characteristics change report 8r obtained by the characteristics verification is stored in the storage part 130.

The GDS data 3a before the DFM include image data 4a before the DFM, and the GDS data 3b after the DFM include image data 4b after the DFM. The characteristics verification part 44 calculates a characteristics change using the image data 4a and the image data 4b, and specifies a module or a block the performance of which may be affected due to the characteristics change to generate a characteristics change report. The characteristics change may be acquired based on the matching probability calculated in step S65 of FIG. 7.

As described above, in the LSI design, the present embodiment may be able to improve the yield without reconducting the timing analysis such as the LSI operation check and timing violation check after the DFM compared to a case in which the timing analysis such as the LSI operation check and timing violation check is reconducted after the DFM auto-correction. Further, the present embodiment may be able to improve the design TAT by eliminating the verification conducted by the engineer.

The present embodiment may provide more advantageous effects in the verification of microfabricated system-on-chip (SoC) layouts of 20 nm process or more.

Further, the application of the present embodiment is not limited to the layout that is change by the DFM. The present embodiment may be applied to characteristic verification after the shrinkage, characteristics verification after auto-corrected layout by a double-patterning process, and characteristics verification after auto-characteristic tuning (signal integrity) based on signal integrity and power integrity (PI).

According to one aspect of the embodiments, a characteristics change caused by the layout change may be effectively verified.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. A method of verifying a layout of a semiconductor integrated circuit, the method comprising:
    executing a timing analysis of the semiconductor integrated circuit based on first layout information acquired after execution of a layout process of the semiconductor integrated circuit;
    executing layout correction with respect to the first layout information;
    comparing the first layout information acquired before the execution of the layout correction and second layout information acquired after the execution of the layout correction to acquire information indicating an RC difference in wires of the semiconductor integrated circuit before and after the execution of the layout correction; and
    adding, by a computer, an effect due to an increase in delay in the wires resulting from the RC difference to timing information obtained by the timing analysis.

2. The method as claimed in claim 1, wherein
    the comparing is executed with respect to a module or a block that is changed by the execution of the layout correction.

3. The method as claimed in claim 2, further comprising:
    matching a plurality of coordinate data pieces of wires randomly selected from first coordinate data of the wires after the layout correction and coordinate data pieces of second coordinate data of the wires before the layout correction; and
    determining presence or absence of a change due to the layout correction on the basis of a ratio of a number of matched results with respect to the coordinate data pieces of the second coordinate data.

4. The method as claimed in claim 1, further comprising:
adding information indicating a delay increment corresponding to the information indicating the RC difference to delay information included in the timing information to update the delay information.

5. A verification apparatus for verifying a characteristics change in a semiconductor integrated circuit, the verification apparatus comprising a computer configured to perform a process including:
executing a timing analysis of the semiconductor integrated circuit based on first layout information acquired after execution of a layout process of the semiconductor integrated circuit;
executing layout correction with respect to the first layout information;
comparing the first layout information acquired before the execution of the layout correction and second layout information acquired after the execution of the layout correction to acquire information indicating an RC difference in wires of the semiconductor integrated circuit before and after the execution of the layout correction; and
adding an effect due to an increase in delay in the wires resulting from the RC difference to timing information obtained by the timing analysis.

6. The verification apparatus as claimed in claim 5, wherein
the comparing is executed with respect to a module or a block that is changed by the execution of the layout correction.

7. The verification apparatus as claimed in claim 6, wherein the process includes:
matching a plurality of coordinate data pieces of wires randomly selected from first coordinate data of the wires after the layout correction and coordinate data pieces of second coordinate data of the wires before the layout correction; and
determining presence or absence of a change due to the layout correction on the basis of a ratio of a number of matched results with respect to the coordinate data pieces of second coordinate data.

8. The verification apparatus as claimed in claim 5, wherein the process further includes:
adding information indicating a delay increment corresponding to the information indicating the RC difference to delay information included in the timing information to update the delay information.

9. The verification apparatus as claimed in claim 5, further comprising:
a storage device configured to store the first layout information, wherein
the process further includes storing the second layout information in the storage device.

10. A non-transitory computer-readable medium storing a program for verifying a characteristics change in a semiconductor integrated circuit, the program, when executed by a processor, causes the processor to execute a process including:
executing a timing analysis of the semiconductor integrated circuit based on first layout information acquired after execution of a layout process of the semiconductor integrated circuit;
executing layout correction with respect to the first layout information;
comparing the first layout information acquired before the execution of the layout correction and second layout information acquired after the execution of the layout correction to acquire information indicating an RC difference in wires of the semiconductor integrated circuit before and after the execution of the layout correction; and
adding an effect due to an increase in delay in the wires resulting from the RC difference to timing information obtained by the timing analysis.

11. The non-transitory computer-readable medium as claimed in claim 10, wherein
the comparing is executed with respect to a module or a block that is changed by the execution of the layout correction.

12. The non-transitory computer-readable medium as claimed in claim 11, wherein the process further includes:
matching a plurality of coordinate data pieces of wires randomly selected from first coordinate data of the wires after the layout correction and coordinate data pieces of second coordinate data of the wires before the layout correction; and
determining presence or absence of a change due to the layout correction on the basis of a ratio of a number of matched results with respect to the coordinate data pieces of the second coordinate data.

13. The non-transitory computer-readable medium as claimed in claim 10, wherein the process further includes:
adding information indicating a delay increment corresponding to the information indicating the RC difference to delay information included in the timing information to update the delay information.

* * * * *